May 17, 1938.　　　A. D. MacLEAN　　　2,117,341
PRESSURE COMPENSATING REGISTER FOR GAS METERS
Original Filed June 21, 1930　　2 Sheets-Sheet 1

INVENTOR.
Allen D. MacLean
Strauch + Hoffman
ATTORNEYS

May 17, 1938.   A. D. MacLEAN   2,117,341
PRESSURE COMPENSATING REGISTER FOR GAS METERS
Original Filed June 21, 1930   2 Sheets—Sheet 2

INVENTOR.
Allen D. MacLean.
BY Strauch & Hoffman
ATTORNEYS

Patented May 17, 1938

2,117,341

UNITED STATES PATENT OFFICE

2,117,341

PRESSURE COMPENSATING REGISTER FOR GAS METERS

Allen D. MacLean, Pittsburgh, Pa., assignor to Pittsburgh Equitable Meter Company, Pittsburgh, Pa., a corporation of Pennsylvania Original application June 21, 1930, Serial No. 462,843. Divided and this application July 2, 1934, Serial No. 733,522

16 Claims. (Cl. 73—233)

This invention relates to an improved mechanism for directly indicating accurately the total flow of gases in spite of variations in the pressure of such gases during the period over which the indication is given. This application is a division of the application of Allen D. MacLean and Fritz Niesemann Serial No. 462,843 filed June 21, 1930, for Pressure compensating gas meter.

As is well known, the usual type of gas meter registers the volume of flow of gas passing therethrough without taking into account or compensating for the fact that a much greater quantity of gas by weight passes through the meter when the pressure on the line is increased. When gas is sold to large users thereof, such as industrial plants, the contract between the gas company and the user usually designates the price of a unit volume of gas at a predetermined pressure, such as four ounces pressure for example. Since the gas is a compressible medium the quantity passing through a meter is dependent not only upon the volume, but also upon the pressure in accordance with Boyle's law. In most installations it is impractical for the gas company to constantly maintain a definite pressure at all times, and frequently it is not feasible to keep as low a pressure as four ounces on the main, since the fluctuating demands of the consumers require a much higher pressure at peak times. Quite frequently gas companies maintain variable pressures in their line under such conditions and obviously the total quantity of gas by weight, or the B. t. u. content of a specified volume is much greater at these higher pressures than at the lower pressures, so that ordinary meters give no correct indication of the total quantity of gas that has passed therethrough.

In order to assure a correct charge to the consumer for the actual amount of gas used, various expedients have heretofore been resorted to by gas companies. In some installations Pitot tubes have been used, or an orifice meter is positioned in the gas conduit and combined with charts on separate dials to record the differential or dynamic pressures for a given period of time, and then obtain separately the average static pressures for the same period, after which the volume of gas as reduced to a definite base pressure is calculated according to the known constant for the orifice or Pitot tube meter. In other installations, the usual displacement type gas meter has been provided with a chart driven either by clockwork, or by movement of the meter itself, this chart being connected with a static pressure gauge such that the static pressure of the gas is registered on the chart. Thus the volume of gas is registered by the gas meter and the pressures thereof may be read from the pressure chart and a series of calculations may be made for set intervals of time, for example, for each half hour, or by volume increments to thus secure an approximately correct calculation of the volume of gas at an unvarying or base pressure. Obviously either of the above methods are laborious and time consuming and liable to human error in calculating the corrected volume of gas.

It is an object of this invention therefore, to provide a measuring system and apparatus for use with gas lines in which the corrected volume of gas as reduced to a predetermined base pressure may be read directly from the meter without computations.

Another object of this invention is to provide a compensating gas meter of the above indicated type in which the parts are compactly arranged in a single instrument and in which the volume of gas passing through the meter is automatically registered at a predetermined base pressure irrespective of fluctuations in pressure in the gas line.

Another object of this invention is to provide a compensating or direct reading gas meter of the above indicated character embodying mechanism whereby the meter may be readily changed to compensate for different base pressures of the gas.

Another object of this invention is to provide a compensating gas meter of the above indicated character having associated therewith a chart upon which is recorded the actual pressures of gases and having a corrected volume register and an uncorrected volume register, whereby the accuracy of the corrected register may be checked by the old method of calculating the pressure and the uncorrected volume, and whereby the pressure variations in the line are automatically recorded for further reference.

Still another object of this invention is to provide a compensating gas meter including a corrected volume register in combination with a record chart upon which is recorded the actual pressure of the gas and time increments of volume.

These and various other objects of our invention will be apparent from the following description and the appended claims when taken in connection with the accompanying drawings, wherein:

Figure 1:
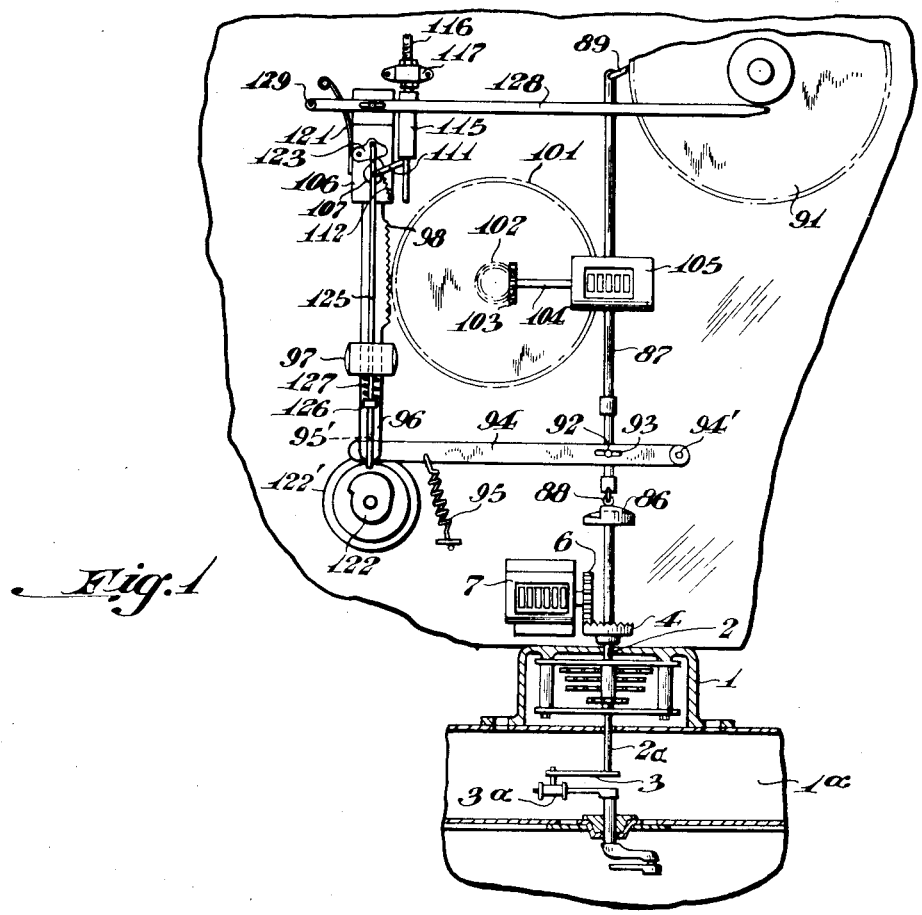
Figure 1 is a partly diagrammatic front view with parts broken away of an embodiment of my invention applied to a positive gas meter, the cycling structure being near the end of its up-stroke.
Figure 3:
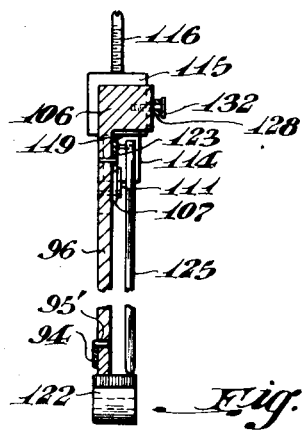
Figure 3 is a section on line III—III of Figure 2, the mechanism being at the bottom of its stroke.
Figure 2:
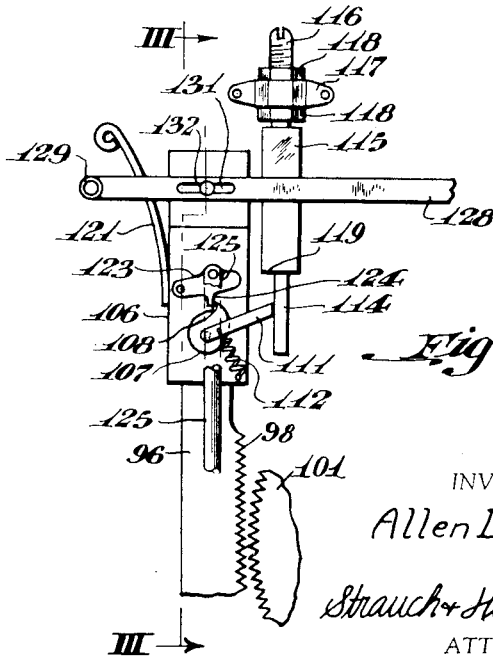
Figure 2 is a detail of the ratchet throw-out mechanism of Figure 1, the mechanism being on its down stroke.

Referring to Figures 1 and 2 of the drawings wherein is illustrated one embodiment of my improved meter, there is provided a vertical shaft 2a having an arm 3 on the lower end thereof within a casing 1 adapted for driving engagement with a rotating crank 3a of a positive gas meter 1a. The shaft 2, which is driven from shaft 2a by suitable gearing, has a crown gear 4 thereon, for engagement with the gear 6 connected directly to a volume register or counter 7, whereby the register 7 will register the volume of gas passing through said meter without regard to the variations in pressure of said gas. The shaft 2 extends upwardly beyond the crown gear 4 and has secured on the upper end thereof a cam member 86. Cam member 86 is provided with a vertically extending cam surface which progressively changes from a low portion to a high portion with a substantially vertical step connecting the highest and lowest portions.

A suitably guided reciprocating shaft 87 having a roller 88 on the lower end thereof is provided, the roller 88 being adapted for contacting engagement with the surface of the cam 86 to thereby reciprocate the shaft 87 vertically as the shaft 2 revolves. The shaft 87 has a spring pressed pawl 89 on the upper end thereof for engagement with the milled edge of a disc 91 having a chart secured thereto whereby the disc 91 is driven in one direction only.

Adjacent its lower end the shaft 87 is provided with a pin 92 which projects into slot 93 of a pivoted and oscillatable lever 94. Lever 94 is pivoted at 94' and has secured, adjacent the other end, a spring 95 for normally maintaining the lever in its lowest position. The upright bar or bracket 96 which together with lever 94 constitutes a cycling means, is guided for vertical movement and for slight lateral movement in a swivel or pivoted bearing 97, and has a projecting pin 95', and lever 94 bears against this pin on its upward cycle of movement. The bar 96 carries fine rack teeth 98 for engagement with the milled edge of a gear 101 which drives the compensated register or counter 105. Gear 101 drives a crown gear 102 for meshing engagement with a corresponding gear 103 mounted on the shaft 104 of the compensated register 105.

The bar 96 is secured at its upper end to a reciprocatory block 106 upon which is pivoted a member 107 having a locking shoulder 108 thereon. Member 107 has secured thereto an arm 111, and is connected to a spring 112 which normally tends to rotate the member 107 in a clockwise direction.

The outer end of the arm 111 is positioned for rubbing engagement with an arm 114 of a stationary adjustable guide block 115 having at its upper end a threaded stud 116. A shoulder 119 is provided at the connection of arm 114 to block 115, and as the arm 111 reciprocates with the block 106 in contact with arm 114, this shoulder is engaged by arm 111 and limits the upward movement of its outer end. The threaded stud 116 passes through a stationary supporting bracket 117 and is provided with two lock nuts 118 on oposite sides of bracket 117, whereby the shoulder 119 may be adjusted to adjust the point at which it is engaged by arm 111 as it moves upwardly. A spring 121 slidably engages the block 106 and tends to maintain the block 106 against guide block 115 and the rack teeth 98 on the bar 96 in engagement with the milled edge of the rotary member 101 on the upstroke of the bar 96, the block 115 and spring 121 serving as a guide for the bar.

From the structure as thus far described it will be seen that when the lever 94 and the bar 96 are moved upwardly by rotating cam 86 due to the passage of an increment of volume of gas through the meter, the rack teeth 98 engage the milled edge of member 101 to cause rotation of the compensated register 105. When the bar 96 approaches near the uppermost limit of its movement the end of pivoted arm 111 engages the shoulder 119, and further upward movement of the bar 96 causes rotation of arm 111 about the pivotal juncture of arm 111 with shoulder 119 whereby the block 106 and rack 98 are moved to the left against the action of spring 121, thus causing the rack teeth 98 on the bar 96 to be disengaged from the milled edge of the rotary member 101, so that for the remainder of the upward cycle of bar 96 the corrected register 105 is not operated. When the roller 88 leaves the high portion of the cam 86 due to rotation of the cam the spring 95 then at once returns the lever 94 to the lowest position, and the spring 127 causes the bar 96 to follow.

A proportional spiral cam 122 is mounted adjacent the lower end of the bar 96 and said cam is connected to a pressure coil 122' of any suitable type to be operated in accordance with the static pressure of gas in the conduit. The cam 122 may be rotated by a mechanism similar to that disclosed in Figures 1 to 5 of said application Serial No. 462,843 of MacLean and Niesemann, or said cam may be mounted directly on the shaft of a pressure coil. As seen in Figure 1, the cam 122 provides an adjustable stop against which the spring 127 moves the bar 96 and rod 125 when the cam 86 allows the spring 95 to return the lever 94 to initial position. This cam or stop is variably positioned in accordance with the pressure of gas in the conduit, and as lever 94 is not fixed to bar 96, the operative movement of the reciprocating bar 96 is governed in accordance with the static pressure of the gas.

In order to maintain the rack teeth 98 out of engagement with the rotary member 101 when the mechanism is returning to its pressure controlled lower position I have provided a locking dog 123 pivoted on the block 106 and provided with a locking shoulder 124 for cooperative engagement with the locking tooth 108 of the member 107, which maintains arm 111 in locked position and thereby keeps rack teeth 98 out of engagement with the milled edge 101 on the downward stroke of bar 96. The locking dog 123 has pivotally connected thereto a downwardly extending rod 125 the lower end of which is adapted to engage on the surface of the cam 122. The rod 125 has secured thereto a ring or shoulder 126, the upper surface of which is engaged by a coil spring 127, the opposite end of the spring engaging the bearing 97 to thus maintain the rod 125 in its lowermost position and tending to return bar 96 to its pressure controlled position.

In order to record the pressure for each increment of volume of gas on the chart driven by member 91 I have provided a registering pen 128 pivoted at 129 and having a slot 131 therein through which projects a pin 132 carried on the block 106. It will thus be seen that the recording arm 128 will record on the chart each oscillation of the movable mechanism. Since the length of each oscillation of the movable mechanism including the block 106 is dependent upon the position of the cam 122 which is governed by the pressure, it will be obvious that the length of the line recorded by the indicating pen 128 will show the actual pressure of gas for each increment of volume.

The operation of this embodiment of the invention is as follows: For each rotation of the shaft 2, the pivoted lever 94 moves through one cycle of operation, the cam forcing said arm upwardly against tension of the spring 95. Due to the spring 121 the rack teeth on the bar 96 are normally engaged with the rotary member 101, whereby upward movement of the mechanism causes the register 105 to be operated. When the arm 111 engages the shoulder 119, the block 106 and the bar 96 are pivoted to the left against tension of spring 121 to disengage the rack teeth 98 from the rotary member 101. Further upward movement of the pivoted lever 94 and bar 96 will have no effect on the register 105 since these parts are disconnected.

The locking shoulder 124 on the pivoted dog 123 engages tooth 108 of the rotary member 107, when said member 107 has rotated to the position shown in Figure 1 to maintain disengagement of the rack 98 from the member 101. When the roller 88 leaves the high portion of the cam 86, the spring 95 at once draws the pivoted lever 94 downwardly, and spring 127 moves bar 96 and block 106 downwardly. The rod 125 projects beyond the lower end of the bar 96 such that this rod is the first to engage the variable stop 122. When this engagement occurs the rod 125 is raised against tension of the spring 127 to lift the locking dog 123 out of engagement with member 107, Figure 5 whereby the spring 121 may reengage the rack 98 with the rotary member 101, the lower end of the bar 96 engaging the variable stop 122 to determine the lower limit of movement for the rack. Since the cam 122 is variably positioned in accordance with the static pressures of gas it will be apparent that the operative throw of the reciprocating mechanism is dependent upon the gas pressure.

The arrangement is such that when the actual or static pressure in the conduit equals the base pressure to which the instrument is set, the cam 122 will have its high portion positioned for engagement by the bar 125 and the bar 96. Due to these conditions the throw of the mechanism is at a minimum and the register 105 will register the same as the register 7. As the pressure increases the cam 122 turns to position lower portions thereof in the path of the movable mechanism, whereby the operative throw of bar 96 will be increased to thereby register higher on the register 105.

It will thus be seen that this embodiment of my invention illustrates a mechanism wherein a reciprocatory member whose movements are in accordance with the volume flow of gas is restricted in its cycle of movement by the static pressure of the gas, the mechanism being so arranged that the compensated register is moved during a portion of the complete throw of said reciprocatory member depending upon gas pressure. It will be understood that when the pressures are low the cam 122 will support the pivoted arm 94 and the roller 88 out of engagement with the cam face 86 during a portion of movement of said cam member. The pressure indicating arm 128 will register on the movable chart the oscillations of the block 106, the length of said oscillations being in accordance with the static pressure of the gas.

The adjustable stop 115 with the shoulder 119 is positioned for adjustment to provide for registration of the mechanism at base pressures. It will be understood that the position of the shoulder 119 governs the period of engagement between the rack teeth 98 and the operating register 105. By adjusting the shoulder 119 vertically, the operative throw of the movable mechanism may be regulated in a simple manner to cause the two registers 7 and 105 to register the same when the static pressure equals the base pressure for which the instrument is designed.

It will be understood that the cam 122 is detachably associated with the pressure gauge by any well known expedient, for example, a set screw for the substitution of other cams, each cam being designed for a particular pressure range.

Figures 4, 5:
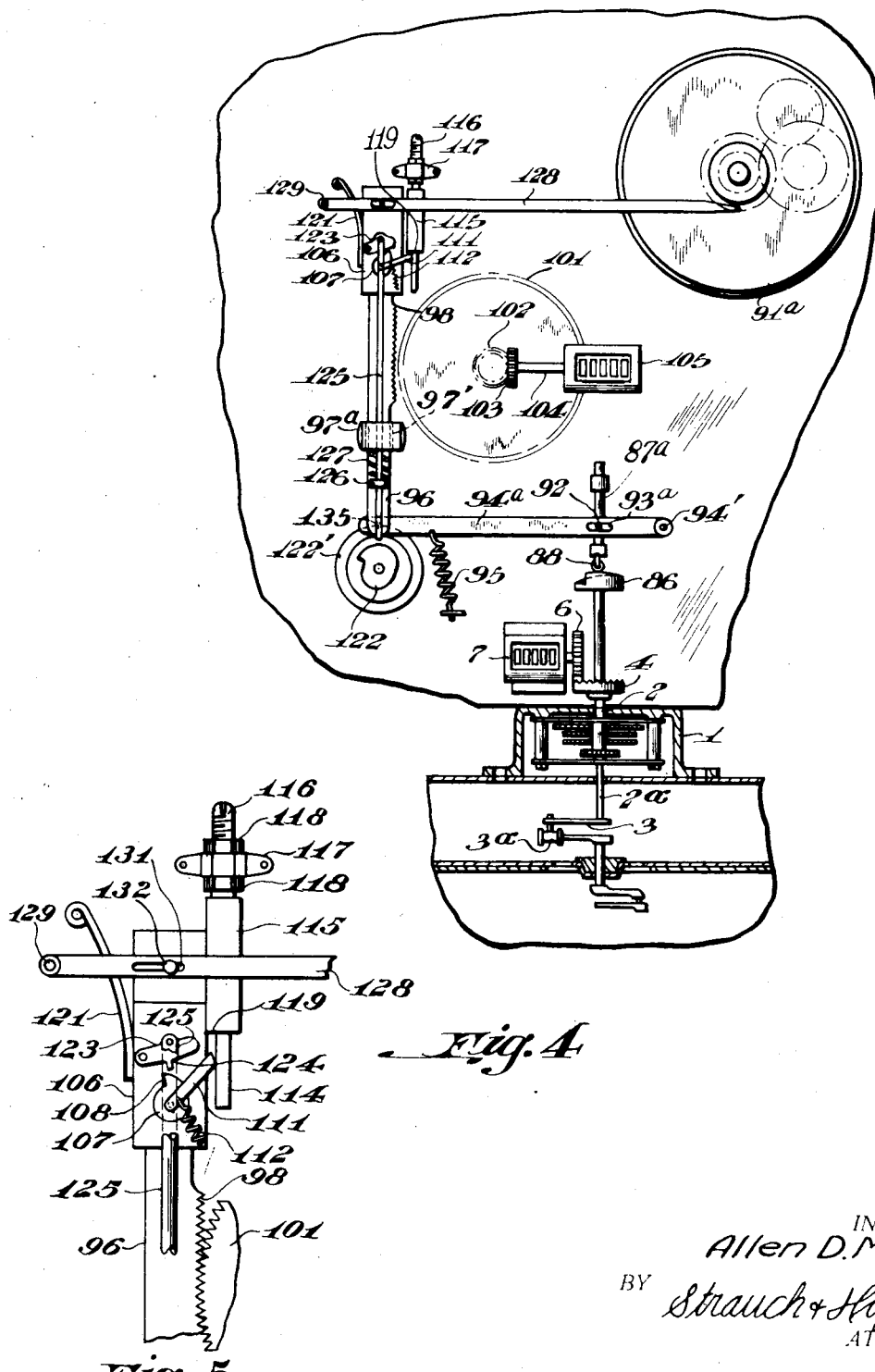
Figure 4 shows a modification similar to Figure 1 in which the chart is driven by a clock.
Figure 5 is a fragmentary view in elevation showing the parts in the position illustrated by Figure 3.

In the modification shown in Figure 4, corresponding parts are numbered alike. In this modification the chart 91a is driven by a time train or clockwork, and the indicating arm 128 registers thereon the static pressure of the gas by the radial length of the lines recorded, and increments of volume of gas by the circumferential spacing of the recorded lines since the number of oscillations per period of time will clearly show the speed of rotation of the shaft 2 which is driven by the volume flow of the gas. Also in this modification shaft 87a which carries the roller 88 is not extended, and lever 94a which is pivoted at 94' and has the slot 93a therein and is pivotally connected at 135 to the upright bar 96, said bar being guided for vertical movement and for slight lateral oscillatory movement in the bearing 97a. The bar 96 has a lateral clearance in the bearing 97a as indicated at 97'. The cam 86 is so located that the follower 88 does not necessarily descend at all times to the face of the cam.

It will be seen from a consideration of the above that I have provided an accurate and readily adjustable gas meter which is comparatively simple and not easily deranged, wherein the volume flow of gas is automatically recorded as of a base pressure, with means wherein the base pressures to be used may be readily adjusted by simply changing the disengaging point of the corrected index drive means.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In a register, a shaft adapted to be driven by a meter, an oscillatory lever, cam means on said shaft for moving said lever in one direction, registering means, register driving means operable by oscillations of said lever for operating said registering means, pressure means responsive to the pressure effective on said meter, means independent of said pressure responsive means for disconnecting said register driving means from said registering means at one point in the movement of said lever, a spring to move the lever in the opposite direction, and means variably positioned by said pressure responsive means in accordance with said pressure for causing reengagement of said register driving means and said registering means.

2. In a volumetric gas meter of the type wherein the volume flow of gas is registered as reduced to a predetermined base pressure, a register; reciprocatory means; means to drive said reciprocatory means in response to a predetermined increment of uncorrected volume flow of gas through the meter; means whereby said reciprocatory means normally operates said register; mechanism for disconnecting said register operating means from the register upon passage of the predetermined increment of uncorrected volume flow of gas through the meter; pressure responsive means responsive to line pressure; a stop positioned by said pressure responsive means to be engaged by said reciprocatory means, said stop governing the throw of said reciprocatory means; and means releasable by said stop for maintaining disengagement of the reciprocatory means and the register.

3. In a mechanism adapted for connection to a volumetric gas meter, a register; means to drive said register to indicate the volume of gas passing through said meter; a second register; pressure responsive means; a chart; means including said pressure responsive means for recording on said chart the static pressures of gas; and means operatively connected to said first mentioned register controlled by said pressure responsive means for driving said second register to increase the readings thereof in accordance with pressure variations to indicate the volume of gas passing through the meter reduced to a predetermined lower base pressure.

4. In a mechanism adapted for connection to a volumetric gas meter; a register; means to drive said register at a rate proportional to the volume of gas passing through said meter under supply pressure; a second register; and means to drive said second register to increase the reading thereof in accordance with supply pressure variation to indicate the volume of gas passing through said meter reduced to a predetermined base pressure, said drive means comprising solely mechanical means including cam means and pressure responsive means to control said solely mechanical means in accordance with supply pressure; a chart; means for driving said chart by said meter at a rate in accordance with the volume flow of gas; and means including said pressure responsive means for recording on said chart the supply pressures of the gas, said chart drive means and said recording means cooperating to record simultaneously pressures affecting said second register drive means.

5. In a volumetric gas meter, a register; and means for driving said register in accordance with the volume flow of gas through said meter so that the register will register the volume of gas as reduced to a predetermined base pressure, comprising a shaft driven by the volumetric gas meter, a driving connection between said shaft and said register, and means including a cam member and a static pressure responsive element for causing said driving connection to drive said register at a rate varied automatically in accordance with the pressure of the gas, and a chart, means for driving said chart by said meter at a rate in accordance with the volume flow of gas and means including said pressure responsive element for recording on said chart the supply pressures of gas.

6. A volumetric gas meter comprising a register and means to drive said register to indicate the volume flow of gas through the meter; a second register; driving means for said second register operatively connected to the driving means of said first named register; said drive means for said second register comprising a cam mechanism and a clutch, and pressure responsive means connected for response to supply pressure to control said cam mechanism to drive said second register by said clutch at a rate varied in accordance with pressure variations to correct the indication of said second register to a predetermined lower base pressure, a chart, means to move said chart and a pressure operated pen actuated by said pressure responsive means for producing a record of pressures on said chart.

7. In a volumetric gas meter, a register; and means for driving said register in accordance with the volume flow of gas through said meter so that the register will register the volume of gas as reduced to a predetermined base pressure, comprising a shaft driven by the volumetric gas meter, a driving connection between said shaft and said register, and means including a cam member and a static pressure responsive element for causing said driving connection to drive said register at a rate varied automatically in accordance with the pressure of the gas, a chart, means for driving said chart at a constant rate, and a recording pen periodically actuated by said driving connection to record on said chart increments of corrected volume.

8. In a register, a shaft adapted to be driven by a meter, an oscillatory member, means for biasing said member in one direction, cam means operated by said shaft for moving said member against the bias, register means, reciprocable register driving means for operating said register means adapted to be reciprocated by said oscillatory member, said reciprocable means adapted to drive said register means when moving in one direction only, means for disengaging said reciprocable means from said register means at a point in its drive movement, pressure responsive means, and a stop variably positioned by said pressure responsive means for reengaging said reciprocable means and register means.

9. In a register, a shaft adapted to be driven by a meter, an oscillatory lever, cam means on said shaft for moving said lever in one direction, registering means, register driving means operable by oscillations of said lever for operating said registering means, a stationary stop, a member operatively connected to said register driving means engageable with said stationary stop and operable by oscillations of said lever for moving said driving means transverse to its normal path of movement to disconnect said register driving means from said registering means, a spring to move the lever in the opposite direction, pressure means responsive to the pressure effective on said meter, and means variably positioned by said pressure responsive means in accordance with said pressure for causing reengagement of said register driving means and said registering means.

10. In a register, a shaft adapted to be driven by a meter, an oscillatory lever, cam means on said shaft for moving said lever in one direction, registering means, register driving means operable by oscillations of said lever for operating said registering means, means for disconnecting said register driving means from said registering means at one point in the movement of said lever, latch means for locking said register driving means in disconnected position, a spring to move the lever in the opposite direction, pressure means responsive to the pressure effective on said meter, and means variably positioned by said pressure responsive means in accordance with said pressure for disengaging said latch means and causing reengagement of said register driving means and said registering means.

11. In a volumetric gas meter for indicating the volume flow of gas passed therethrough reduced to a predetermined base pressure, a shaft driven by said meter, an oscillatory member, means driven from said shaft for moving said member in one direction and yieldingly returning said member to its original position, a counter, means operable upon positive movement of said member for operating said counter, pressure actuated means for determining the period of operativeness of the counter operating means, a chart, means for rotating said chart, and visible recording means controlled by pressure changes and actuated from said oscillatory member for producing a record of gas volume and pressure on said chart.

12. In a volumetric gas meter for indicating the volume flow of gas passed therethrough reduced to a predetermined base pressure, a shaft driven by said meter, an oscillatory member, cam means driven by said shaft for moving said member in one direction, means for yieldably returning said member in the opposite direction, registering means, register driving means engaged upon movement of said member in one direction for operating said registering means, means effective at a predetermined point in such movement for disengaging the register driving means from the registering means, and pressure actuated means for determining the amount of movement of the register driving means.

13. In a volumetric gas meter for indicating the volume flow of gas passed therethrough reduced to a predetermined base pressure, a shaft driven by said meter, a corrected pressure counter having a gear, an oscillatable member, cam means driven from said shaft for moving said member in one direction, a drive gear rendered operable upon movement of said member in said one direction for driving the corrected pressure counter gear, means for removing said drive gear from contact with the corrected counter gear and pressure actuated means effective upon said member for determining the amount of movement of said member.

14. In a register, a shaft adapted to be driven by a meter, an oscillatory lever, cam means on said shaft for moving said lever in one direction, registering means, reciprocable means adapted to be reciprocated by said lever, said reciprocable means being adapted to drive said registering means when moving in one direction only, means for disconnecting said reciprocable means from said registering means at one point in the movement of said reciprocable means in said one direction, a spring to move said lever in the opposite direction, pressure responsive means responsive to the pressure effective on said meter, and means variably positioned by said pressure responsive means in accordance with said pressure for causing reengagement of said reciprocable means and said registering means.

15. In a register having a pressure responsive element and a shaft adapted to be driven by a meter, registering means provided with a gear, register driving means, a shiftable bar serving as a part of the register driving means, toothed means on said bar and said bar being shiftable to engage or disengage said gear and toothed means, cam means on said shaft to effect movement of said bar, a control arm operatively connected to said bar at a portion removed from said toothed means, and a member variably positioned by said pressure responsive element and adapted to engage said control arm for effecting bodily movement of said whole bar to place said toothed means in engagement with said gear.

16. In a register having a pressure responsive element and a shaft adapted to be driven by a meter, a pressure corrected counter having a gear, a movably mounted member, cam means driven by said shaft for effecting movement of said member in one direction only, said member being normally urged in the opposite direction, toothed means on said member adapted to engage said gear only when said member is moved in said one direction, and means controlled by said pressure responsive element for determining the amount of contact between said gear and said toothed means.

ALLEN D. MacLEAN.